Oct. 26, 1965                L. W. DEEHAN ETAL                3,213,702
                                    JACKSCREW
Filed Oct. 15, 1963                                              2 Sheets-Sheet 2
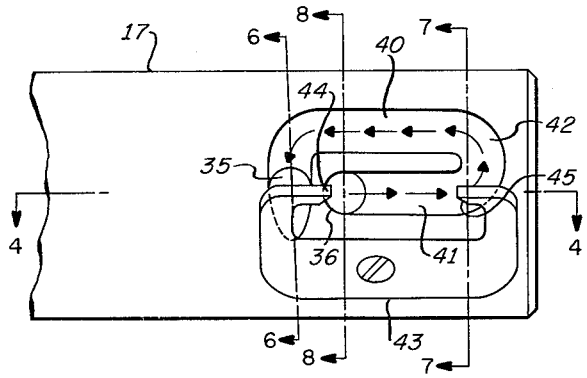
FIG.3.
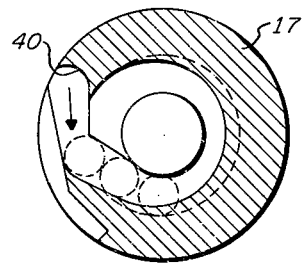
FIG.6.
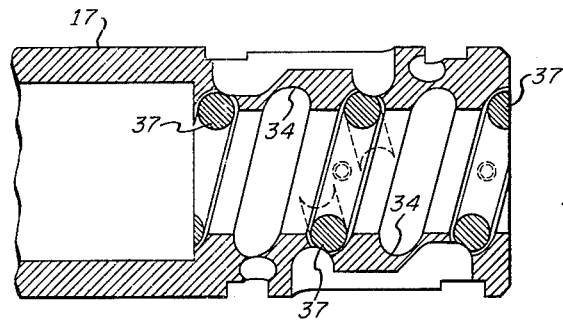
FIG.4.
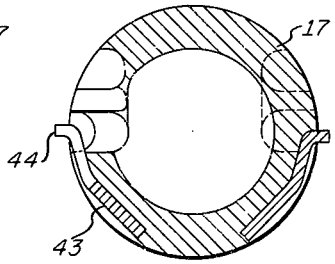
FIG.7.
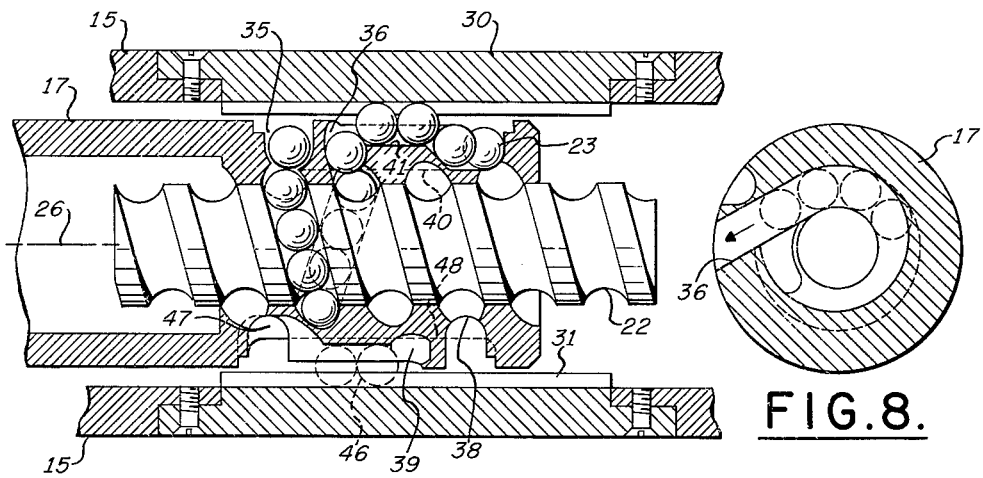
FIG.5.
FIG.8.
INVENTORS
LEONARD W. DEEHAN
PETER E. JACOBSON
BY
Arthur H. Serrell
ATTORNEY

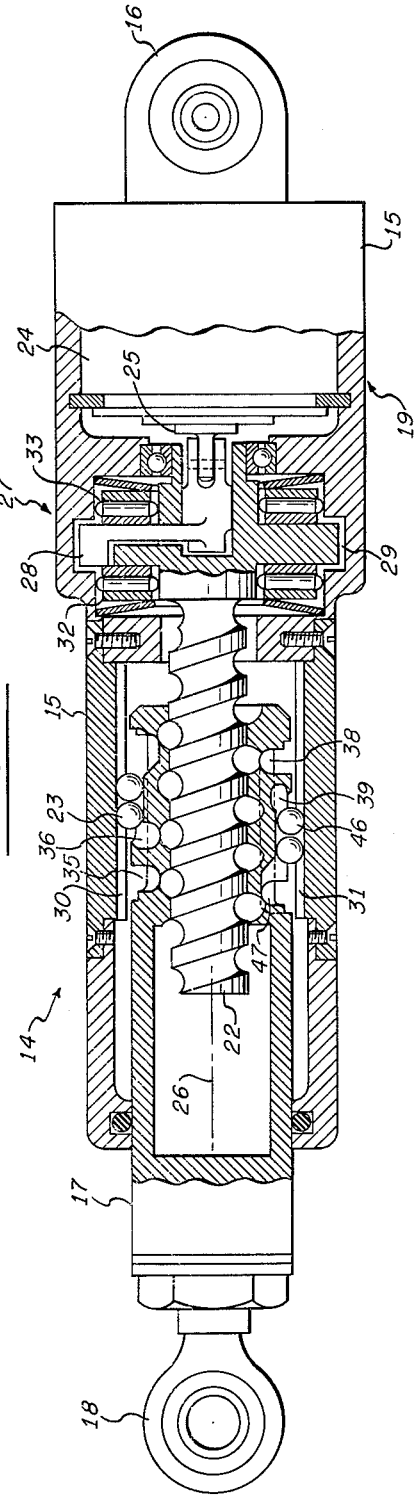

United States Patent Office 3,213,702
Patented Oct. 26, 1965

3,213,702
JACKSCREW
Leonard W. Deehan, Scottsdale, and Peter E. Jacobson, Phoenix, Ariz., assignors to Sperry Rand Corporation, Great Neck, N.Y., a corporation of Delaware
Filed Oct. 15, 1963, Ser. No. 316,253
10 Claims. (Cl. 74—424.8)

This invention relates to a jackscrew of the ball bearing type. The improved bidirectional device converts reversible rotary to bidirectional rectilinear motion and is further useful as a variable length link where the respective frame and jack elements of the jackscrew include external pivot connections. The noted mechanical conversion is effected through a train of ball bearings so that the mechanism operates at a high efficiency level with low friction losses. As a link, the device is relatively insensitive to changes in loading condition along the axis of the screw.

A jackscrew constructed in accordance with the present invention includes a frame with a rectilinear ball guide, a rotatable screw with helical ball grooves mounted on the frame to turn about an axis parallel to the guide, a translatable jack movable along the axis with axially spaced ball ports and an external ball race with upper and lower level portions and a connecting ramp, and a train of ball bearings that travel around the groove in the screw, move through the ports and along the ball race with the balls in the upper level portion of the race engaging the rectilinear ball guide on the frame to actuate the jack depending on the direction of rotation of the screw. The geometrical configurations of the screw, jack and ball elements of the improved device are such as to cause the balls to move into and out of the groove in the screw at a rate that agrees with the translational velocity of the jack with relation to the frame. The ball bearings of the train accordingly roll rather than slide along the external race provided on the jack.

In the preferred structure, the frame of the improved device includes a further rectilinear ball guide in 180 degree angular relation to the first guide with relation to the axis of the screw, and the jack includes second ball ports cooperating with the screw independently of the first ports and a related external ball race identical to the first race also disposed in 180 degree angular relation to the first race with respect to the axis of the screw.

The balls of the train travelling along the upper level race of the improved jackscrew between the race and the ball guide on the frame move with the jack along the axis of the screw as well as prevent the jack from moving about the axis.

Other features and further structural details of the invention will become apparent from the following description of the device in connection with the accompanying drawings in which:

FIG. 1 is a schematic view showing a portion of the elevator linkage of a combined manual and automatic servo system for aircraft in which the improved jackscrew is a link of variable length therein;

FIG. 2 is an enlarged sectional view taken vertically through the frame of the device shown in FIG. 1;

FIG. 3 is a detail top view of the jack element of the device;

FIG. 4 is a sectional view taken on line 4—4 in FIG. 3;

FIG. 5 is a further enlarged view of the character shown in FIG. 2;

FIG. 6 is a sectional view taken on line 6—6, in FIG. 3;

FIG. 7 is a sectional view taken on line 7—7, in FIG. 3; and

FIG. 8 is a sectional view taken on line 8—8, in FIG. 3.

In the servo system illustrated in FIG. 1, the chassis of an aircraft is indicated at 10, and the represented elements include elevators 11 and a rocker 12 suitably pivoted to the chassis 10. The manual input to the system is provided by a human pilot by way of an input link 13 pivotally connected to one end of the rocker 12. A variable length link 14 provided by the relatively axially movable frame and jack elments of the improved jackscrew connects the other end of the rocker 12 to the elevators 11. As shown in FIG. 1, a relatively stationary frame 15 provides an arm of link 14 that includes an external pivot connection 16 for the rocker 12. The movable arm of the link 14 is provided by a jack 17 having an external pivot connection 18 for the elevators 11. The length of the link 14 is varied in the represented system by the operation of suitable drive means shown as an electric motor 19 that is energized by the output of an automatic pilot 20 fed thereto by way of lead 21.

As shown in FIG. 2, the elements of the improved jackscrew include the link arm or stationary frame 15, the translatable link arm or jack 17, a screw with helical ball grooves indicated at 22, and a train of ball bearings 23. The driving means or motor 19 includes a stator part 24 that is fixedly mounted in the frame 15 and an output shaft 25. The shaft 25 is arranged to turn the screw 22 about its longitudinal axis 26 by way of an interlocking mechanism generally indicated at 27. Mechanism 27 serves the purpose of connecting the screw 22 to the frame 15 when there is no output from the automatic pilot 20 to operate the motor 19. When the shaft 25 of the motor 19 turns, the interlock mechanism is rendered ineffective and a trip arm 28 of the mechanism connected to the end of the shaft 25 engages a flange part 29 on one end of the screw 22 to turn the screw 22 about its axis 26.

The jack 17 of the improved device is moved in translation along axis 26 with relation to the frame 15. The rotary input to the device is reversible so that the resulting rectilinear motion of the jack is bidirectional to either shorten or lengthen the distance between the pivot connections 16 and 18. In the embodiment of the invention shown in the drawings, the frame 15 of the device includes a pair of ball guides 30 and 31 that are disposed in 180 degree angular relation parallel to the axis 26. The balls 23 in the bearing train travel along the guide 30 as the same impart motion to the jack 17 along the axis. A similar independent train of ball bearings is included in the device for the guide 31 but is not shown herein except for the balls shown in the guide 31 in FIGS. 2 and 5 for the sake of clarity in the drawings and a possible misinterpretation of structure as far as the ball bearings are concerned. As shown in FIG. 2, the frame provides an open ended cylindrical housing in which the stator 24 of motor 19 is fixedly mounted at one end and where the jack 17 extends through the open end. Screw 22 is arranged concentrically to the shaft 25 within the frame 15 by means of suitable axially spaced bearings 32 and 33. In the provided structure, the screw 22 is mounted in the frame 15 by the bearings 32 and 33 to turn about its longitudinal axis 26 in parallel relation to the spaced guides 30 and 31.

The translatable element of the device is provided by the jack 17. The configuration of the jack is tubular, with the closed end of the tube extending from the frame 15 and the open end of the tube arranged between the screw 22 and the frame 15. Jack 17 is accordingly movable along the axis 26 bidirectionally depending on the direction of rotation of the shaft 25. As shown in FIG. 4, the end wall of the jack is internally threaded as indicated at 34 to provide a portion of the ball track that includes the grooves of the screw 22. In the illustrated embodiment of the invention, the jack is also provided with ball ports 35 and 36 for the particular train of balls 23 that are axially spaced from one another corresponding to one turn of the screw 22 and are normal to the axis 26. To confine the balls 23 to a single encirclement of the screw, the threaded portion 34 of the jack includes a helix 37 that is removed from the threaded portion between the ports 35 and 36. The ports provided in the jack 17 for the ball train omitted from the drawing are indicated at 38 and 39 in FIG. 5. In encircling the screw 22, it will accordingly be understood that the balls 23 move between the helical ball groove in the screw 22 and the threaded portion 34 of the jack 17 to the left as viewed in FIG. 4 of the central unremoved part of the helix 37. The threaded portion 34 of the jack 17 to the right of the unremoved part of the helix 37 is provided for the balls of the other ball train. In accordance with the invention, each of whatever number of ball trains that are included in the device are independent of one another. The ball ports 38 and 39 cooperating with screw 22 have the same axial spacing as the ports 35 and 36 and, as herein shown, are arranged in the jack 17 disposed in 180 degree angular relation thereto with respect to the axis 26. In operation, the balls 23 encircling the screw between ports 35 and 36 move into and out of the ports as the screw turns depending on its direction of rotation.

As shown in FIGS. 3 and 7, the external periphery of the jack 17 includes a ball race that connects the ports 35 and 36 having an axially extending lower level portion 40 with an end terminating at port 35, an axially extending upper level portion 41 having an end terminating at port 36, and a ramp portion 42 that connects the upper and lower race portions 40 and 41. A fastening 43 connected to the jack 17 includes tapered ends 44, 45 that function as guides where the balls 23 change their direction of travel particularly in entering or leaving the ports 35 and 36 and in being directed either down or up the ramp portion 42 of the race with relation to the upper level race portion 41. An identical ball race is provided on the jack 17 for the other ball train that is disposed in 180 degree angular relation to the described race with respect to the axis. The upper level portion of the related race is indicated at 46 in FIG. 5. In the same figure, the ramp portion and lower level portions are respectively indicated at 47 and 48.

The balls 23 of the bearing train encircle the groove between ports 35 and 36 as well as fill the portions 40, 41 and 42 of the ball race. The balls 23 in the upper level portion 41 of the race engage the rectilinear ball guide 30 on the frame. The jack 17 is accordingly confined to translate along the axis 26 of the screw 22 as it moves with the turning of the shaft 25 of motor 19. The travel of the train of ball bearings in the device transmits the motion of the screw 22 to the jack 17 with the balls moving into and out of the groove in the screw and along the portions of the race. The elements are designed so that the rate that the balls move through the ports in the jack corresponds to the translational velocity desired for the jack 17.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A jackscrew of the ball bearing type including a frame having a bearing and a part with a rectilinear ball guide, a screw with a helical ball groove mounted in the bearing to turn about a longitudinal axis parallel to the guide, a jack arranged between the screw and frame to move along the axis having axially spaced ball ports normal to the axis and an external ball race connecting the ports having a lower level portion with an end terminating at one of the ports, an axially extending upper level portion with an end terminating at the other of the ports and a ramp portion between the other ends of the upper and lower portions of the race, a train of ball bearings encircling the groove in the screw between the ports and filling the ball race of the jack with the balls on the upper level portion of the race engaging the rectilinear ball guide on the frame operable to travel along the race and through the ports into and out of the groove in the screw, and reversible means for turning the screw having a part fixed to the frame and a part connected to the screw to move the jack through the travel of the train of ball bearings.

2. A device of the character claimed in claim 1, in which the frame includes a second rectilinear ball guide disposed in 180 degree angular relation to the first ball guide with respect to the longitudinal axis, the jack includes second ball ports cooperating with the screw independently of the first ports and a related external ball race identical to the first race also disposed in 180 degree angular relation to the first race with respect to the longitudinal axis, and a second train of ball bearings for the second guide, bearing race and ports.

3. A device of the character claimed in claim 1, in which the axial spacing between the ports corresponds to one turn of the grooved screw.

4. A device of the character claimed in claim 1, in which the frame includes an external pivot connection, the jack includes an external pivot connection, and the frame and jack are parts of a variable length link.

5. In a jackscrew of the ball bearing type, a frame having a bearing and a part with a rectilinear ball guide, a screw with a helical ball groove mounted in the bearing to turn about a longitudinal axis parallel to the guide, a jack movable along the axis having axially spaced ball ports normal to the axis and an external ball race between the ports having a lower level portion terminating at one of the ports, an axially extending upper level portion with an end terminating at the other of the ports and a ramp portion connecting the upper and lower level portions of the race, and a train of ball bearings encircling the groove in the screw between the ports and filling the ball race of the jack with the balls on the upper level portion of the race engaging the rectilinear ball guide on the frame.

6. A device of the character claimed in claim 5, including means for turning the screw about its longitudinal axis.

7. In a variable length link, a first pivot arm having a bearing and a part with a retilinear internal ball guide, a screw with a helical ball groove mounted in the bearing to turn about a longitudinal axis parallel to the guide, a second pivot arm with a jack movable along the axis having axially spaced ball ports normal to the axis and an external ball race between the ports having a lower level portion terminating at one of the ports, an axially extending upper level portion terminating at the other of the ports and a ramp portion connecting the upper and lower level portions of the race, and a train of ball bearings encircling the groove on the screw between the ports and filling the ball race of the jack of the second arm with the balls on the upper level portion of the race engaging the rectilinear ball guide on the ball guide of the first arm.

8. A link of the character claimed in claim 7, including reversible means for turning the screw having a part fixed to the first arm and a part fixed to the screw.

9. A link of the character claimed in claim 7, in which the first arm includes a second rectilinear ball guide disposed in 180 degree angular relation to the first ball guide with respect to the longitudinal axis, the jack of the second arm includes second ball ports cooperating with the screw independently of the first ports and a related external ball race identical to the first race also disposed in 180 degree angular relation to the first race with respect to the longitudinal axis, and a second train of ball bearings for the second guide, bearing race and ports.

10. A link of the character claimed in claim 7, in which the ports of the jack of the second arm are spaced axially corresponding to one turn of the grooved screw.

References Cited by the Examiner

UNITED STATES PATENTS 2,197,155　4/40　Nardone _____ 74—424.8 X

DON A. WAITE, *Primary Examiner.*